(No Model.)

J. E. EVANS.
ANTI FRICTION BEARING.

No. 316,348. Patented Apr. 21, 1885.

UNITED STATES PATENT OFFICE.

JAMES E. EVANS, OF CINCINNATI, OHIO.

ANTI-FRICTION BEARING.

SPECIFICATION forming part of Letters Patent No. 316,348, dated April 21, 1885.

Application filed March 3, 1885. (No model.)

*To all whom it may concern:*

Be it known that I, JAMES E. EVANS, a citizen of the United States, residing at Cincinnati, in the county of Hamilton and State of Ohio, have invented certain new and useful Improvements in Anti-Friction Bearings, of which the following is a description.

My invention relates to that class of frictional bearings in which a rotating axle bears upon a series of rollers within a circular-chamber; and my invention consists in closing the ends of the chamber by means of the wheels carried by the axle, so as to confine the rollers in their place, as fully set forth hereinafter.

Figure 1:
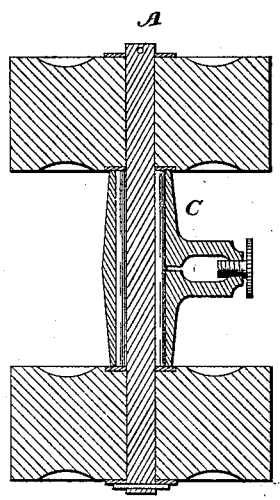
Figure 2:
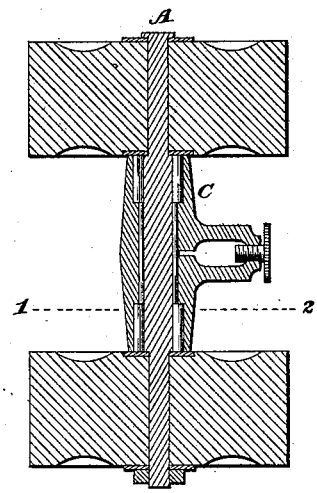
Figure 3:
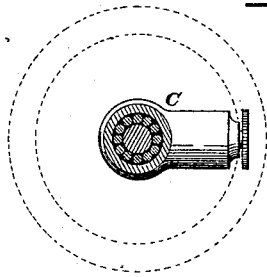

In the drawings, Figure 1 is a longitudinal section of a head, shaft, and wheels illustrating my invention. Fig. 2 is a modification; Fig. 3, a section on the line 1 2, Fig. 2.

A is the shaft or axle, and C is the head or bracket, through which the shaft extends, the said head C being shown as cylindrical in form, and being bored through for the passage of the shaft, the bore being either of uniform diameter, as in Fig. 1, or being enlarged at the ends to form annular shoulders s, as shown in Fig. 2.

To the opposite ends of the shaft are secured the wheels B, the sides of which are close to the ends of the cylinder C, and so that the wheels close the bore in the said cylinder; and extending the length of the bore, or only in the enlarged portions of the said bore, are arranged friction-rollers C', which have their bearing upon the shaft and upon the inside face of the bore, and which in Fig. 2 are confined between the shoulders s and the sides of the wheels, as will be readily understood from an examination of the drawings. As the shaft revolves it turns free from contact with any stationary bearing, resting wholly upon the rollers, which travel with it and around it in the bore, whereby the shaft is permitted to turn with the utmost freedom and with but little friction. By the construction above described I am enabled to manufacture the bearing and retain the rollers in place without the use of the collars, caps, and other retaining appliances heretofore employed, the wheels B preventing the rollers from moving outward, while after moving either wheel access can be had freely to the annular chamber formed by the bore and axle for the purpose of replacing or repairing or adjusting the rollers. Each wheel is secured to the shaft so as to turn frictionally upon the end thereof, thereby carrying the shaft as the wheel revolves, but permitting the wheel to move upon the shaft slower or faster than the latter, as is necessary in turning curves, when one wheel turns faster than the other.

I do not here claim a head or cylinder bored through from one side to the other, enlarged at the ends, receiving an axle and rollers, and closed at the ends by wheels upon the axle; nor do I claim the specific arrangement and construction of parts shown in Fig. 2, as these features are claimed in another division of this application, Serial No. 154,265.

I claim—

1. The combination, in anti-friction bearings, of an axle carrying at the ends rollers held frictionally thereon and a cylinder having a bore larger than the axle and anti-friction rollers confined in the bore by the wheels, substantially as set forth.

2. The combination of the head or cylinder C, having a bore extending from end to end, axle extending through said bore, wheels on the axle closing the ends of said bore, and rollers interposed between the axle and cylinder, substantially as described.

In witness whereof I, the said JAMES E. EVANS, have hereunto set my hand, at Cincinnati, Ohio, this 27th day of March, A. D. 1885.

JAMES E. EVANS.

Attest:
O. M. HILL,
JNO. W. STREHLI.